[19] United States Patent
Kachare et al.

(10) Patent No.: US 10,353,628 B2
(45) Date of Patent: Jul. 16, 2019

(54) OPPORTUNITY WINDOW HINTS FOR BACKGROUND OPERATIONS IN SSD

(71) Applicant: Samsung Electronics Co., Ltd., Suwon-si, Gyeonggi-do (KR)

(72) Inventors: Ramdas Kachare, Cupertino, CA (US); Jongmin Gim, Milpitas, CA (US); Yang Seok Ki, Palo Alto, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

(21) Appl. No.: 15/624,430

(22) Filed: Jun. 15, 2017

(65) Prior Publication Data
US 2018/0300084 A1 Oct. 18, 2018

Related U.S. Application Data
(60) Provisional application No. 62/485,296, filed on Apr. 13, 2017.

(51) Int. Cl.
G06F 3/06 (2006.01)
G06F 12/10 (2016.01)
G06F 11/34 (2006.01)

(52) U.S. Cl.
CPC .......... G06F 3/0659 (2013.01); G06F 3/0611 (2013.01); G06F 3/0653 (2013.01); G06F 3/0679 (2013.01); G06F 11/34 (2013.01); G06F 12/10 (2013.01); G06F 2212/7201 (2013.01)

(58) Field of Classification Search
CPC .... G06F 3/0659; G06F 3/0611; G06F 3/0653; G06F 3/0679; G06F 12/10; G06F 2212/7201
See application file for complete search history.

(56) References Cited

U.S. PATENT DOCUMENTS

| | | | |
|---|---|---|---|
| 8,447,918 B2 | 5/2013 | Sprinkle | |
| 8,626,986 B2 | 1/2014 | Wu | |
| 8,762,798 B2 | 6/2014 | Hu | |
| 9,244,617 B2 | 1/2016 | Bux et al. | |
| 9,329,991 B2 | 5/2016 | Cohen | |
| 9,383,926 B2 | 7/2016 | Law | |
| 9,461,904 B2 | 10/2016 | Tomlin | |
| 9,582,417 B2 | 2/2017 | Narasimha | |
| 2010/0262766 A1* | 10/2010 | Sprinkle | G06F 12/0246 711/103 |
| 2014/0310494 A1* | 10/2014 | Higgins | G11C 16/349 711/167 |
| 2015/0032939 A1* | 1/2015 | Gao | G06F 12/0253 711/103 |

* cited by examiner

Primary Examiner — Eric Cardwell
(74) Attorney, Agent, or Firm — Innovation Counsel LLP

(57) ABSTRACT

A method includes: receiving a plurality of host commands from a host to access storage media of a solid-state drive (SSD); monitoring a raw rate for performing the plurality of host commands; calculating an average rate by taking an average of the raw rate over a time unit; comparing the average rate against a threshold; detecting that the average rate falls below the threshold indicating an opening of an opportunity window; providing hints for the opportunity window; and determining whether to perform pending or imminent background operations during the opportunity window.

20 Claims, 5 Drawing Sheets

OPPORTUNITY WINDOW HINTS FOR BACKGROUND OPERATIONS IN SSD

CROSS-REFERENCE TO RELATED APPLICATION(S)

This application claims the benefits of and priority to U.S. Provisional Patent Application Ser. No. 62/485,296 filed Apr. 13, 2017, the disclosure of which is incorporated herein by reference in its entirety.

TECHNICAL FIELD

The present disclosure relates generally to solid-state drives (SSDs), more particularly, to a system and method for providing opportunity window hints for performing background operations in an SSD.

BACKGROUND

Solid-state drives (SSDs) store host/user data in storage media such as flash media. The flash media has certain read/write and endurance characteristics that need to be carefully managed. An SSD controller manages the flash media of the SSD to provide a reliable, high performance, and cost-effective data storage. The SSD controller needs to perform various internal background operations to prolong the life cycle and to provide reliable operation of the SSD. Examples of such internal background operations are recycling, garbage collection, data structure updates for a flash translation layer (FTL), various statistical and log updates, and cache offloads.

These background operations can take a substantial portion of a flash channel bandwidth and the resources of the SSD controller. Some of the background operations such as garbage collection and recycling are quite complex potentially causing significant interruptions to the host read/write operations. The bandwidth and latency observed by a host may fluctuate significantly due to the internal background operations of the SSD.

SUMMARY

According to one embodiment, a method includes: receiving a plurality of host commands from a host to access storage media of a solid-state drive (SSD); monitoring a raw rate for performing the plurality of host commands; calculating an average rate by taking an average of the raw rate over a time unit; comparing the average rate against a threshold; detecting that the average rate falls below the threshold indicating an opening of an opportunity window; providing hints for the opportunity window; and determining whether to perform pending or imminent background operations during the opportunity window.

According to another embodiment, a solid-state drive (SSD) includes: a flash media; and a controller comprising a host interface layer, a flash translation layer, and a flash interface layer. The host interface layer is configured to: receive a plurality of host commands from a host to access storage media of a solid-state drive (SSD); monitor a raw rate for performing the plurality of host commands; calculate an average rate by taking an average of the raw rate over a time unit; compare the average rate against a threshold; detect that the average rate falls below the threshold indicating an opening of an opportunity window; and provide hints for the opportunity window to the flash translation layer. The flash translation layer is configured to determine whether to perform pending or imminent background operations during the opportunity window. The flash interface layer is configured to perform data transfer to and from the flash media in accordance with the plurality of host commands.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
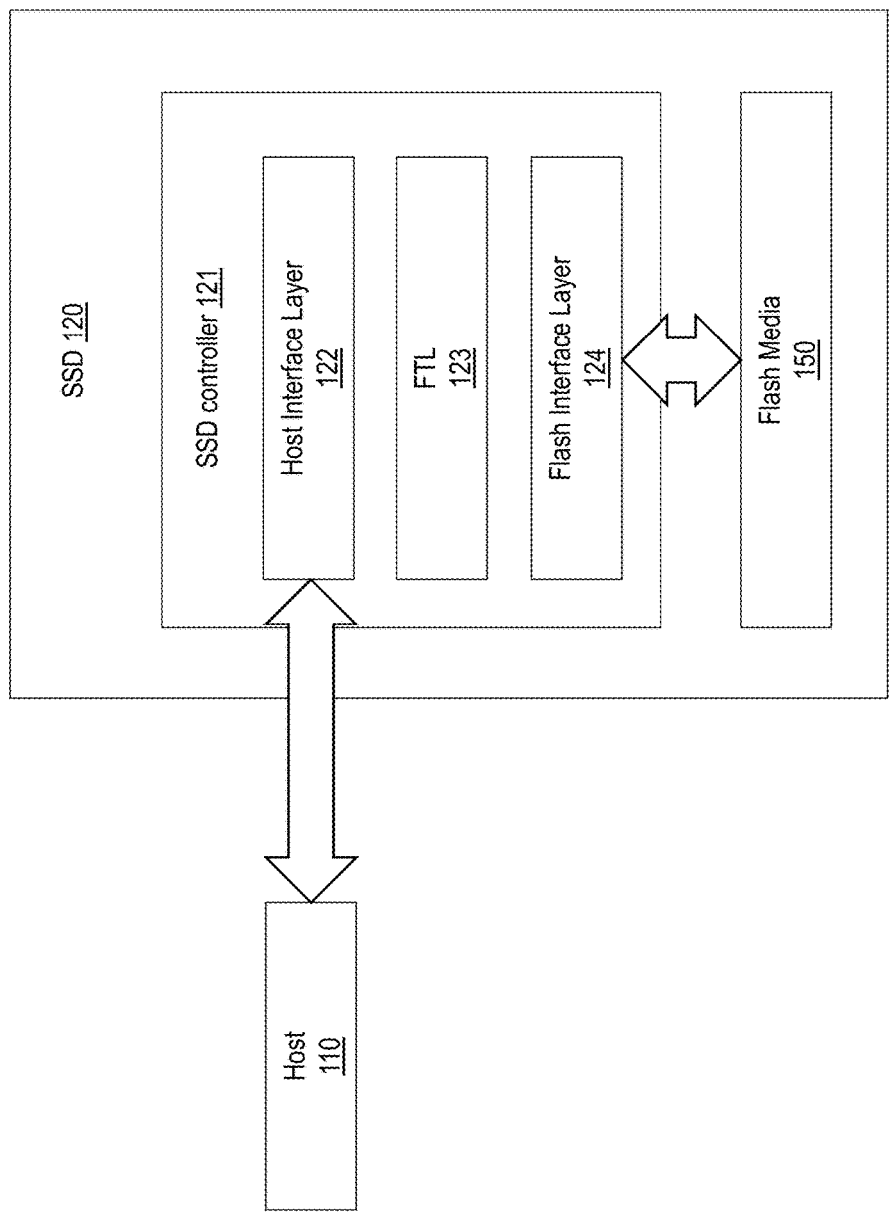
FIG. 1 shows a block diagram of an example solid-state drive (SSD), according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for providing opportunity window hints for performing background operations in an SSD. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure provides a system and method for detecting and providing optimal time windows for performing background operations of a solid-state drive (SSD). An SSD controller can perform internal background operations of the SSD such as recycling, garbage collection, data structure updates for a flash translation layer (FTL), various statistical and log updates, and cache offloads in the optimal time windows to minimize the interruption and avoid potential conflict with host-initiated I/O operations.

According to one embodiment, a host interface layer of an SSD monitors a rate of host I/O operations and provides a hint indicating that optimal time windows are available to a flash translation layer (FTL) of the SSD. The optimal time windows are also referred to as opportunity windows. The FTL can determine whether to execute all or some of the pending or imminent background operations in the optimal time windows reducing or avoiding an impact to the host-initiated I/O operations. The host interface layer may not propose any specific flash translation algorithm, and merely provides hints to the FTL on when to perform background operations based on an existing FTL algorithm.

FIG. 1 shows a block diagram of an example solid-state drive (SSD), according to one embodiment. The SSD 120 includes flash media 150 and an SSD controller 121. According to one embodiment, the SSD 120 is a non-volatile memory express (NVMe) memory including non-volatile storage media attached via a peripheral component interconnect express (PCIe) bus. In another embodiment, the SSD 120 is a memory compatible with the NVMe over Fabrics (NVMe-oF) standard. In this case, the SSD 120 can be accessible via the underlying fabrics such as Ethernet, Fibre Channel, and InfiniBand.

The SSD controller 121 includes a host interface layer 122, a flash translation layer (FTL) 123, and a flash interface layer 124. The host interface layer 122 provides a host interface between a host 110 and the SSD controller 121. The FTL 123 translates logical block addresses (LBAs) into physical block addresses (PBAs) using a mapping table, and accesses physical blocks of the flash media 150 as indicated by the mapping table to perform the requested host I/O commands on the physical blocks of the flash media 150. Examples of the host I/O commands include, but are not limited to, read, write, read/modify/write (RMW), and delete commands. The flash interface layer 124 performs the actual data transfer to and from the flash media 150 in accordance with the host I/O commands and FTL mappings.

According to one embodiment, the host interface layer 122 can track a rate of host read operations. For example, the host interface layer 122 calculates a host read rate by taking an average of host read operations over a predetermined period of time (e.g., 1 microsecond, 1 millisecond, 1 second). A host read rate is also herein referred to as a host read bandwidth. The host interface layer 122 periodically checks the host read rate against a threshold (i.e., a host read rate threshold). The host read rate threshold can be programmable via a command received from the host 110. When the host read rate falls below the host read rate threshold, the host interface layer 122 considers that a background operations opportunity window is open. When the host read rate crosses above the host read rate threshold, the host interface layer 122 considers that the background operations opportunity window is closed.

The FTL 123 can initiate and perform internal housekeeping background operations during the opportunity window. For example, the FTL can perform a background operation for updating a FTL mapping table and storing the updated FTL mapping table to the flash media 150. As host commands are executed, the FTL mapping table keeps changing as new write data is written to new physical locations in the flash media 150. The FTL mapping table can also change due to such background operations as offloading a write cache, recycling and garbage collection of the flash media, and LBA Trim commands from the host. The FTL 123 needs to periodically save the changes of the FTL mapping table to the flash media 150 in a background operation. In addition to the FTL mapping table, the FTL 123 updates and periodically saves other FTL statistics tables such as program/erase (P/E) counts per block and various logs to the flash media 150.

During the background operations opportunity window, the FTL 123 can perform all or some of the background operations as long as the opportunity window remains open. When the opportunity window closes, the FTL 123 can halt or scale down the active background operations to minimize the impact to the subsequent host I/O performance.

According to one embodiment, the FTL 123 may elect to perform specific background operations among the pending or imminent background operations during an opportunity window. Depending on the application, the threshold, and the characteristics of the workload, opportunity windows may not be available periodically or may be hard to obtain. In this case, the FTL may perform certain pending or imminent background operations irrespective of the opportunity windows hints received from the host interface layer. In one embodiment, the SSD controller may determine that the current threshold may be set too high to have enough chances or duration of opportunity windows. In this case, the SSD controller can use a threshold from a predetermined set of thresholds set by the host. Certain background operations can be delayed but they cannot be delayed indefinitely, and need to be performed within a certain time period in order not to affect the overall host I/O performance while achieving the required reliability and endurance of the SSD. In this case, an opportunity window may merely indicate a time window when host I/O operations are performed less, indicating a potential opportunity to perform background operations, but does not demand that operations must take place during such a window. The background operations that are electively performed within the opportunity windows can thus reduce or avoid conflicts or collision with host operations and minimize an impact on the host I/O performance.

Although a host read rate is primarily used for the opportunity window detection, the SSD controller 121 can track a different rate of host operations to detect an opportunity window. For example, the SSD controller 121 can track a rate of host write operations and detect an opportunity window based on a host write rate in a similar fashion as a host read rate. The threshold that is used for detecting an opportunity window based on a host write rate may be different from the threshold that is used for detecting an opportunity window based on a host read rate. In some embodiments, the SSD controller 121 may track both a host read rate and a host write rate to detect an opportunity window to balance both the host read rate and the host write rate. In this case, a weighting factor may be applied when calculating a combined host read/write rate to account for the contribution of the respective host read and write operations toward the overall host I/O performance. In some embodiments, a host read rate may be used for a host read intensive application, and a host write rate may be used for a host write intensive application.

According to one embodiment, the host interface layer 122 can track multiple rates of host operations. For example, the host interface layer 122 can track both a rate of host read operations and a rate of host write operations. The host interface layer 122 periodically checks the multiple rates of host operations against a set of rate thresholds (e.g., a host read rate threshold and a host write rate threshold). The rate thresholds can be programmable via a command received from the host 110. When each of the rates falls below the corresponding rate threshold, the host interface layer 122 considers that an opportunity window is open. According to one embodiment, the multiple rates of host operations can be checked independently from one another. This is because the resources required to perform some background operations may be different from the resources required to perform other background operations. In this case, an opportunity window for certain background operations can be open while another opportunity window for other background operations may be closed. According to another embodiment, the multiple rates are checked against the corresponding rate thresholds simultaneously to determine whether an opportunity window is open or closed.

The host interface layer 122 performs host command fetching, initiates the execution of host commands, transfers data associated with the host commands, and finally posts completion entries to the host 110 to indicate whether the host commands are successfully performed. In addition to these generic tasks, the host interface layer 122 can monitor a host read/write rate as each of the host commands is completed. The host interface layer 122 can accumulate the size of the data (e.g., bytes, dwords, or logical blocks) transferred to/from the host 110 during a time unit. Some examples of time unit resolution are 1 microsecond, 1 millisecond, and 1 second. The time unit for accumulating the data transfer may be programmed by the host 110 via a host command. For every time unit, the host interface layer 122 keeps track of a raw host read/write rate based on the accumulated size of the data. When calculating the raw host read/write rate, the host interface layer 122 can apply a smoothening function (e.g., a low pass filter). Based on the raw host read/write rate, the host interface layer 122 calculates an average host read/write rate by applying a programmable weight to the raw host read/write rate. The raw host read/write rate and the calculated average host read/write rate can be stored for detecting opportunity windows and/or for a future reference. The raw host read/write rate can sharply fluctuate, and the host interface layer 122 can average the raw host read/write rate to smooth out the sharpness and calculate the average host read/write rate. The weight of the average function can be programmed and fine-tuned by the system software and/or a host driver based on the application running on the host 110.

Below is a pseudo code for computing a raw host read/write rate and calculating an average host read/write rate, according to one embodiment.

```
For every host command { // compute raw rate
    Fetch host command;
    Initiate host command execution;
    Perform any data transfers needed;
    Post appropriate completion entry to the host;
    If host command is read/write operation {
        accumulated_read/write_size = accumulated_read/write_size + current read/write command size;
    }
}
For every time trigger { // compute average rate
avg_read/write_rate (new) = WEIGHT * accumulated_read/write_size + (1 - WEGHT)
* avg_read/write_rate (old);
    accumulated_read/write_size = 0; // reset it
}
```

For each host read/write command, the host interface layer 122 calculates an accumulated data size corresponding to the executed host commands. The value of the accumulated read/write size is stored in an accumulator.

For every time trigger (e.g., 1 microsecond), the host interface layer 122 calculates an average host read/write rate based on an average WEIGHT parameter. The averaging WEIGHT parameter is programmably set between 0 and 1. The averaging WEIGHT parameter is used to determine a degree of smoothening to be performed on the raw host read rate. For example, the WEIGHT of 1 indicates no smoothening whereas the WEIGHT of 0 indicates that the average is clamped to zero. After calculating average host read/write rate, the host interface layer 122 resets the accumulated read/write size of the accumulator to calculate a new average host read/write rate in a subsequent time unit. The host interface layer 122 can repeat the process and continue to calculate, monitor, and store the values of the host read/write rate. The host interface layer 122 can periodically compare the values of the host read/write rate against one or more thresholds and provide hints to the FTL regarding opportunity windows to perform background operations.

Figure 2:
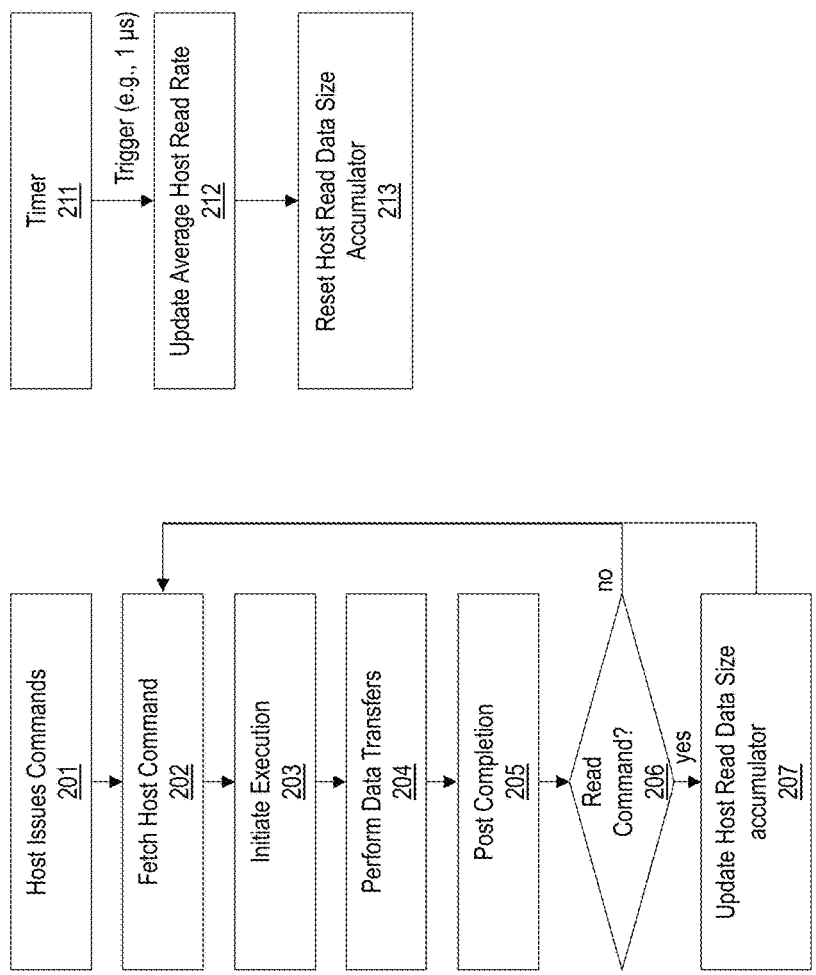
FIG. 2 is a flowchart of an example process for computing an average host read rate, according to one embodiment.

FIG. 2 is a flowchart of an example process for computing an average host read rate, according to one embodiment. It is noted that a similar flow chart is applicable for calculating a host write rate or a combined host read/write rate.

A host issues I/O commands to an SSD (201). A host interface layer of an SSD controller of the SSD performs command fetching (202) and initiates execution of the received host I/O commands (203). A flash translation layer (FTL) and a flash interface layer of the SSD controller perform data transfers to execute each of the host I/O commands (204), and the host interface layer finally posts a completion entry back to the host (205). For each executed host command, the host interface layer checks if the executed host command is a host read command (206) and updates a host read data size (207). For other host commands, the steps 206 and 207 for calculating an average host read rate are bypassed.

The host interface layer also runs a timer (211). For every time trigger (e.g., 1 microsecond), the host interface layer calculates and updates an average host read rate (212) and resets the host read data size to calculate a new host read/write rate corresponding to a subsequent time unit (213).

Write cache offloading is another example of internal background operations to be performed by the FTL 123. A write cache can be present in on-chip buffers, or an external memory, or even in a faster flash type media. The FTL 123 periodically transfers the write cache to the main flash media 150. When the FTL performs a write cache offload operation during a peak time window where host I/O operations are intensively performed, the performance of the host I/O operations may be adversely affected.

The FTL 123 also needs to periodically perform recycling of flash blocks/pages and garbage collection. The flash blocks of the flash media 150 need to be erased and added to a pool of free blocks. Some of the flash blocks selected for garbage collection may contain some valid data that needs to be moved to another flash block(s) before such blocks are erased. These recycling and garbage collection operations can significantly take the flash bandwidth, and hence, can have an adverse effect on the host I/O performance if the host I/O operations conflict or collide with the recycling and garbage collection operations.

According to one embodiment, the host interface layer 122 can monitor an average host read/write rate and compare the average host read/write rate against a programmable threshold. When the average read/write rate falls below a set threshold, the host interface layer 122 considers that a background operations opportunity window is open. The host interface layer 122 provides the opportunity window to the FTL 123 as a hint for performing background operations. Using the opportunity window, the FTL 123 decides an actual execution of background operations. The background operations scheduled during the opportunity window would minimally affect the host I/O performance.

According to one embodiment, the FTL 123 may ignore the opportunity window hints received from the host interface layer 122 and may not perform specific background operations during the opportunity window for various reasons. For example, some imminent background operations may need to be performed after a certain event or during a certain time window irrespective of the hints for the opportunity window. When such an opportunity window hint is received, the FTL 123 can check whether all or some pending or imminent background operations can be executed. When the host read/write rate crosses above the threshold, the host interface layer 122 indicates to the FTL 123 that the opportunity window is closed. After the opportunity window closes, the FTL 123 may stop or scale back the internals background operations that started in the opportunity window.

Figure 3:
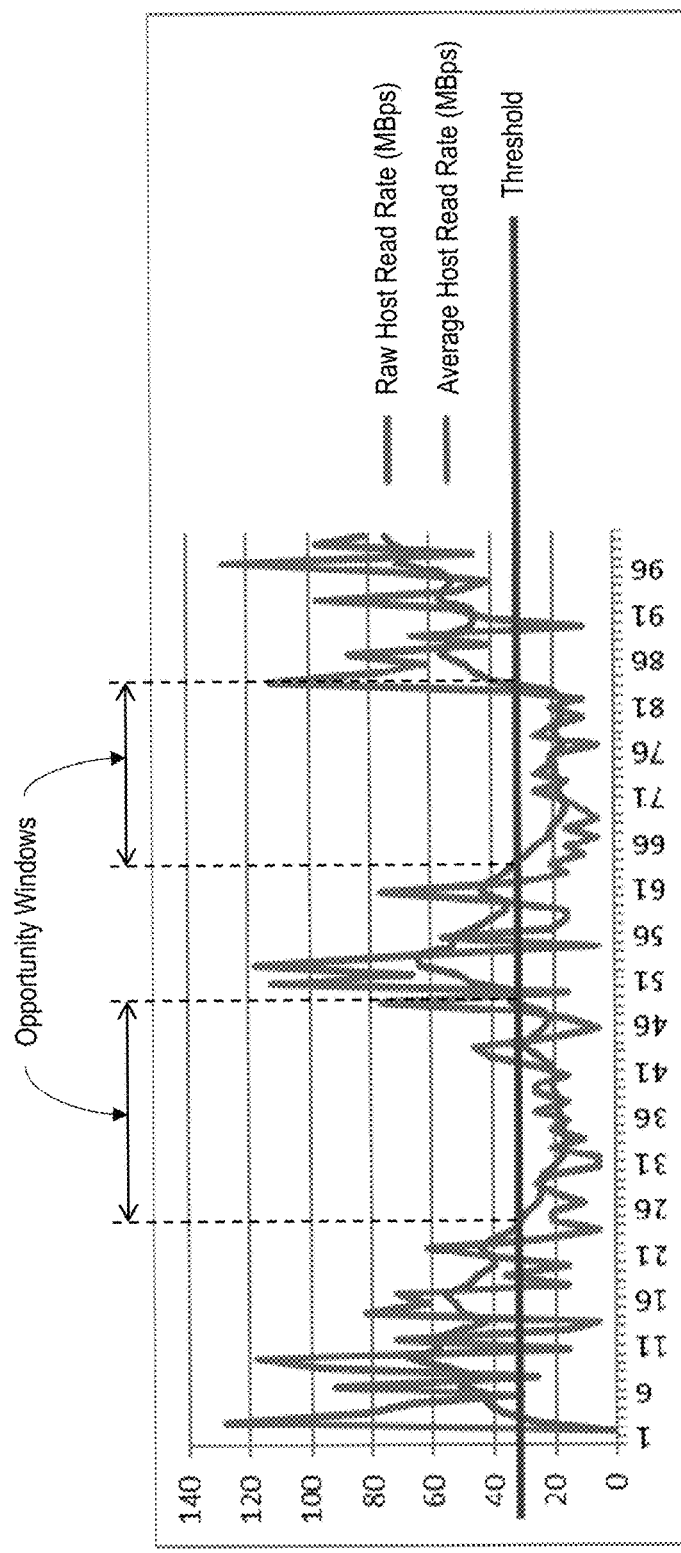
FIG. 3 shows an example of an opportunity window.

FIG. 3 shows an example of an opportunity window. The raw host read rate fluctuates at a high frequency, and the host interface layer averages the fluctuating raw host read rate to calculate an average host read rate. In the present example, opportunity windows open between 24 and 49 microseconds and between 64 and 83 microseconds when the average host read rate is lower than the threshold of 32 MBps. Referring to FIG. 1, the threshold used for detecting the opportunity window is programmable and can be set by the host 110. The host 110 may apply different thresholds based on an application and the characteristics of the flash media 150 and the host I/O operations. According to one embodiment, the host 110 can program various parameters for calculating the host read/write rate. Examples of host-programmable parameters include, but are not limited to, an opportunity window threshold and read/write averaging function weights. The host 110 can program these parameters using values stored in a reserved space in the registers of the SSD or sending Set Feature/Get Feature commands of the NVMe standard, or vendor-specific commands to the SSD. In some embodiments, the SSD can employ various learning algorithms to adjust the parameters for calculating the host read/write rate and fine tune the rate thresholds.

Figure 4:
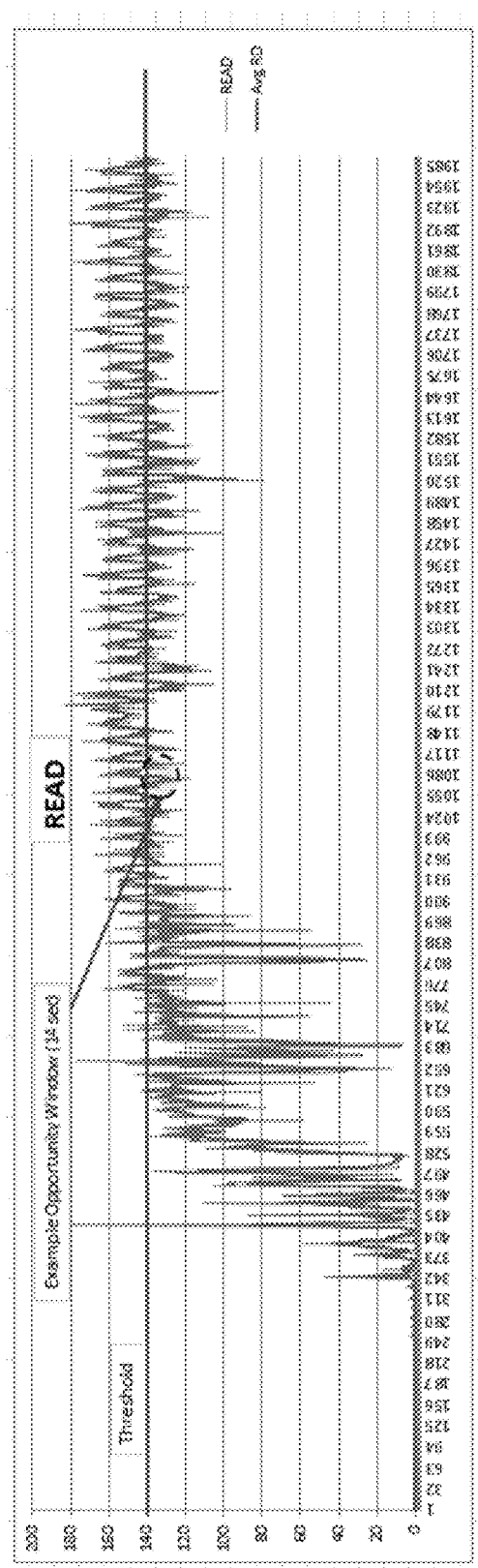
FIG. 4 shows a use case example of a database application for showing opportunity windows for performing background operations.

FIG. 4 shows a use case example of a database application for showing opportunity windows for performing background operations. The workload used in the present example is tailored for RocksDB database application for a Twitter use case. In the present example, the I/O size is 4 KB, the workload is reads and random writes, the database block cache is 20 GB, and 16 I/O threads are used.

The trace of the host read rate shown in FIG. 4 indicates that opportunity windows are available periodically. Using the opportunity windows as hints for performing background operations, the SSD controller can reduce the conflicts and collision between host I/O operations and internal background operations.

Below is a pseudo code for the FTL to utilize opportunity window hints provided by the host interface layer.

```
For every time trigger { // check average host read rate
    If (avg_read_rate < THRESHOLD) { // window opens
        "Background Ops Window" = OPEN;
        Perform any pending or imminent background operations;
    }
    Else if (avg_read_rate > THRESHOLD) { // window closes
        "Background Ops Window" = CLOSE;
        Halt or scale-down active background operations;
    }
}
```

Figure 5:
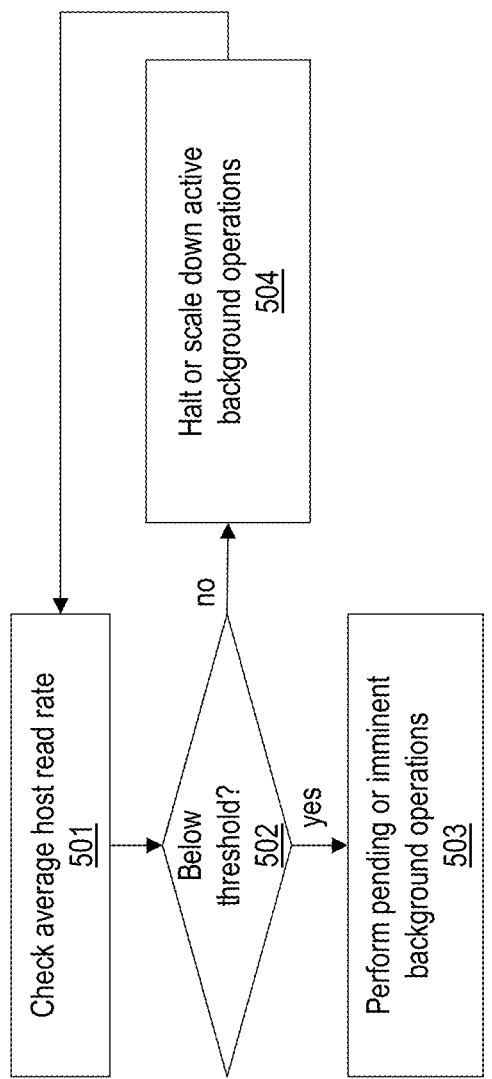
FIG. 5 is a flowchart of an example process for performing background operations based on an average host read rate, according to one embodiment.

FIG. 5 is a flowchart of an example process for performing background operations based on an average host read rate, according to one embodiment. It is noted that a similar flow chart is applicable for calculating a host write rate or a combined host read/write rate.

The host interface layer keeps track of a host read rate and compares the host read rate against a programmable threshold (501). If the host read rate is below the threshold (502), the host interface layer determines that an opportunity window for performing background operations is open. In this case, the FTL performs pending or imminent background operations during the opportunity window (503). If the host read rate is above the threshold (502), the host interface layer determines that an opportunity window for performing background operations is closed. In this case, the FTL halts or scale down active background operations to free up the flash channel bandwidth for performing the host I/O operations (504).

Erasure coding (EC) is a method of data protection in which data is broken into fragments, expanded and encoded with redundant data pieces and stored across a set of different locations or different storage media. Erasure coding enables the reconstruction of data that becomes corrupted at some point in the disk storage process using the redundant data that is stored at different locations or different storage media. Erasure codes are advantageous over traditional RAID for their ability to reduce the time and overhead required to reconstruct data. The drawback of erasure coding is that it can be more CPU-intensive that can translate into an increased I/O latency.

According to one embodiment, the present system and method for providing opportunity windows can be extended to an erasure coding of a group of SSDs. At any given point, N SSDs among the group of SSDs (N depends on the erasure coding scheme) can be offline, and data can still be restored by the erasure code. When an opportunity window is available in a particular SSD, the SSD can check if (counting itself) there are N or fewer SSDs that are inoperable or suffering from enhanced latency within the erasure coding group. If there are fewer than N SSDs, the SSD can safely start its background operations. Even if the opportunity window prediction is incorrect, the erasure coding group can still handle the operation without a delay since the data can be constructed from the remaining, un-impacted drives using the erasure coding.

According to one embodiment, a method includes: receiving a plurality of host commands from a host to access storage media of a solid-state drive (SSD); monitoring a raw rate for performing the plurality of host commands; calculating an average rate by taking an average of the raw rate over a time unit; comparing the average rate against a threshold; detecting that the average rate falls below the threshold indicating an opening of an opportunity window; providing hints for the opportunity window; and determining whether to perform pending or imminent background operations during the opportunity window.

The method of claim 1 may further include: initiating a host command among the plurality of host commands; posting a completion entry for each of the plurality of host commands; and updating the average rate after executing each host command.

The raw rate may be a raw host read rate, and the average rate may be an average host read rate.

The raw rate may be a raw host write rate, and the average rate may be an average host write rate.

The method may further include: calculating a plurality of average rates by taking an average of a plurality of raw rates over a time unit; comparing the plurality of average rates against a set of thresholds; detecting that a first average rate falls below a first threshold indicating an opening of a first opportunity window; detecting that a second average rate falls below a second threshold indicating an opening of a second opportunity window; providing hints for the first and second opportunity windows; determining whether to perform a first subset of the pending or imminent background operations during the first opportunity window; and determining whether to perform a second subset of the pending or imminent background operations during the second opportunity window.

A host interface layer of the SSD may provide the hints indicating that the opportunity window is available to a flash translation layer (FTL) of the SSD.

The background operations may include one or more of updating a FTL mapping table to the flash media, saving a table for program/erase (P/E) counts per block and various logs to the flash media, write cache offloading, and recycling flash blocks/pages, and garbage collection.

The average rate may be calculated with a weight parameter.

The threshold may be determined based on one or more of an application running on the host, a type of the SSD, characteristics of the host commands.

The method may further include: detecting that the average rate crosses over the threshold indicating a closure of the opportunity window; and halting or scaling down active background operations.

The method may further include: programming one or more parameters for calculating the average rage using commands received from the host.

According to another embodiment, a solid-state drive (SSD) includes: a flash media; and a controller comprising a host interface layer, a flash translation layer, and a flash interface layer. The host interface layer is configured to: receive a plurality of host commands from a host to access storage media of a solid-state drive (SSD); monitor a raw rate for performing the plurality of host commands; calculate an average rate by taking an average of the raw rate over a time unit; compare the average rate against a threshold; detect that the average rate falls below the threshold indicating an opening of an opportunity window; and provide hints for the opportunity window to the flash translation layer. The flash translation layer is configured to determine whether to perform pending or imminent background operations during the opportunity window. The flash interface layer is configured to perform data transfer to and from the flash media in accordance with the plurality of host commands.

The host interface layer may be further configured to: initiate a host command among the plurality of host commands; post a completion entry for each of the plurality of host commands; and update the average rate after executing each host command.

The raw rate may be a raw host read rate, and the average rate may be an average host read rate.

The raw rate may be a raw host write rate, and the average rate may be an average host write rate.

The host interface layer may be further configured to: calculate a plurality of average rates by taking an average of a plurality of raw rates over a time unit; compare the plurality of average rates against a set of thresholds; detect that a first average rate falls below a first threshold indicating an opening of a first opportunity window; detect that a second average rate falls below a second threshold indicating an opening of a second opportunity window; provide hints for the first and second opportunity windows; determine whether to perform a first subset of the pending or imminent background operations during the first opportunity window; and determine whether to perform a second subset of the pending or imminent background operations during the second opportunity window.

The background operations may include one or more of updating a FTL mapping table to the flash media, saving a table for program/erase (P/E) counts per block and various logs to the flash media, write cache offloading, and recycling flash blocks/pages, and garbage collection.

The average rate may be calculated with a weight parameter.

The threshold may be determined based on one or more of an application running on the host, a type of the SSD, characteristics of the host commands.

The host interface layer may be further configured to detect that the average rate crosses over the threshold indicating a closure of the opportunity window. The flash translation layer may be further configured to halt or scale down active background operations.

One or more parameters for calculating the average rage may be programmed using commands received from the host.

The SSD may be compatible with the non-volatile memory express (NVMe) standard of the NVMe over Fabrics (NVMe-oF) standard.

The above example embodiments have been described hereinabove to illustrate various embodiments of implementing a system and method for providing opportunity window hints for performing background operations in an SSD. Various modifications and departures from the disclosed example embodiments will occur to those having ordinary skill in the art. The subject matter that is intended to be within the scope of the invention is set forth in the following claims.

What is claimed is:

1. A method comprising:
   receiving a plurality of host commands from a host to access storage media of a solid-state drive (SSD);
   monitoring a raw rate for performing the plurality of host commands based on an amount of data transferred between the host and the SSD;
   calculating an average rate by taking an average of the raw rate over a time unit using a host-programmable weight;
   comparing the average rate against a threshold;
   detecting that the average rate falls below the threshold indicating an opening of an opportunity window;
   providing hints for the opportunity window; and
   determining whether to perform pending or imminent background operations during the opportunity window,
   wherein the method further comprises:
   calculating a plurality of average rates by taking an average of a plurality of raw rates over a time unit;
   comparing the plurality of average rates against a set of thresholds;
   detecting that a first average rate falls below a first threshold indicating an opening of a first opportunity window;
   detecting that a second average rate falls below a second threshold indicating an opening of a second opportunity window;
   providing hints for the first and second opportunity windows;
   determining whether to perform a first subset of the pending or imminent background operations during the first opportunity window; and
   determining whether to perform a second subset of the pending or imminent background operations during the second opportunity window.

2. The method of claim 1, further comprising:
   initiating a host command among the plurality of host commands;
   posting a completion entry for each of the plurality of host commands; and
   updating the average rate after executing each host command.

3. The method of claim 1, wherein the raw rate is a raw host read rate, and the average rate is an average host read rate.

4. The method of claim 1, wherein the raw rate is a raw host write rate, and the average rate is an average host write rate.

5. The method of claim 1,
   wherein the host sends a host command to the SSD to program the host-programmable weight.

6. The method of claim 1, wherein a host interface layer of the SSD provides the hints indicating that the opportunity window is available to a flash translation layer (FTL) of the SSD.

7. The method of claim 1, wherein the background operations include one or more of updating an FTL mapping table to the flash media, saving a table for program/erase (P/E) counts per block and various logs to the flash media, write cache offloading, and recycling flash blocks/pages, and garbage collection.

8. The method of claim 1, the threshold is determined based on one or more of an application running on the host, a type of the SSD, characteristics of the host commands.

9. The method of claim 1, further comprising:
   detecting that the average rate crosses over the threshold indicating a closure of the opportunity window; and
   halting or scaling down active background operations.

10. The method of claim 1, further comprising:
    programming one or more parameters for calculating the average rate using commands received from the host.

11. A solid-state drive (SSD) comprising:
    a flash media; and
    a controller comprising a host interface layer, a flash translation layer, and a flash interface layer,
    wherein the host interface layer is configured to:
    receive a plurality of host commands from a host to access storage media of a solid-state drive (SSD);
    monitor a raw rate for performing the plurality of host commands based on an amount of data transferred between the host and the SSD;
    calculate an average rate by taking an average of the raw rate over a time unit using a host-programmable weight;
    compare the average rate against a threshold;
    detect that the average rate falls below the threshold indicating an opening of an opportunity window; and
    provide hints for the opportunity window to the flash translation layer,
    wherein the flash translation layer is configured to determine whether to perform pending or imminent background operations during the opportunity window, and
    wherein the flash interface layer is configured to perform data transfer to and from the flash media in accordance with the plurality of host commands,
    wherein the host interface layer is further configured to:
    calculate a plurality of average rates by taking an average of a plurality of raw rates over a time unit;
    compare the plurality of average rates against a set of thresholds;
    detect that a first average rate falls below a first threshold indicating an opening of a first opportunity window;

detect that a second average rate falls below a second threshold indicating an opening of a second opportunity window;

provide hints for the first and second opportunity windows;

determine whether to perform a first subset of the pending or imminent background operations during the first opportunity window; and determine whether to perform a second subset of the pending or imminent background operations during the second opportunity window.

12. The SSD of claim 11, wherein the host interface layer is further configured to:

initiate a host command among the plurality of host commands;

post a completion entry for each of the plurality of host commands; and update the average rate after executing each host command.

13. The SSD of claim 11, wherein the raw rate is a raw host read rate, and the average rate is an average host read rate.

14. The SSD of claim 11, wherein the raw rate is a raw host write rate, and the average rate is an average host write rate.

15. The SSD of claim 11, wherein the background operations include one or more of updating an FTL mapping table to the flash media, saving a table for program/erase (P/E) counts per block and various logs to the flash media, write cache offloading, and recycling flash blocks/pages, and garbage collection.

16. The SSD of claim 11, wherein the host sends a host command to the SSD to program the host-programmable weight.

17. The SSD of claim 11, wherein the threshold is determined based on one or more of an application running on the host, a type of the SSD, characteristics of the host commands.

18. The SSD of claim 11, wherein the host interface layer is further configured to detect that the average rate crosses over the threshold indicating a closure of the opportunity window, and wherein the flash translation layer is further configured to halt or scale down active background operations.

19. The SSD of claim 11, wherein one or more parameters for calculating the average rate are programmed using commands received from the host.

20. The SSD of claim 11, wherein the SSD is compatible with the non-volatile memory express (NVMe) standard of the NVMe over Fabrics (NVMe-oF) standard.

* * * * *